(12) United States Patent
Chung

(10) Patent No.: US 6,815,606 B1
(45) Date of Patent: Nov. 9, 2004

(54) BIPOLAR MULTI ELECTROSTATIC INDUCING DISCHARGE-DISSIPATION LIGHTNING AIR TERMINALS

(76) Inventor: Young-Ki Chung, 102-1404, Samsung Apt., 374 Dangsan-dong, Yeongdeungpo-gu, 150-040 Seoul (KR)

( * ) Notice: Subject to any disclaimer, the term of this patent is extended or adjusted under 35 U.S.C. 154(b) by 0 days.

(21) Appl. No.: 10/625,665

(22) Filed: Jul. 24, 2003

(30) Foreign Application Priority Data

Jun. 25, 2003 (KR) .................................. 10-2003-0041606

(51) Int. Cl.$^7$ ............................................... H02G 13/00
(52) U.S. Cl. ......................................... 174/3; 174/4 R
(58) Field of Search ................................ 174/1–3, 4 R, 174/5 R, 5 SG, 7; 361/216, 219, 220, 222

(56) References Cited

U.S. PATENT DOCUMENTS

| | | | | |
|---|---|---|---|---|
| 4,180,698 A | * | 12/1979 | Carpenter, Jr. .................. | 174/2 |
| 4,910,636 A | * | 3/1990 | Sadler et al. ................ | 174/4 R |
| 5,073,678 A | * | 12/1991 | Carpenter, Jr. .............. | 174/4 R |
| 5,638,248 A | | 6/1997 | Fawthrop | |
| 6,167,896 B1 | * | 1/2001 | Smith ............................. | 174/3 |
| 6,307,149 B1 | * | 10/2001 | Zini et al. ....................... | 174/3 |
| 6,320,119 B1 | * | 11/2001 | Gumley ........................... | 174/3 |
| 6,498,291 B2 | * | 12/2002 | Brammer ........................ | 174/3 |
| 6,649,825 B2 | * | 11/2003 | Rapp ............................... | 174/3 |
| 6,690,562 B2 | * | 2/2004 | Fowler et al. .................. | 174/2 |
| 2004/0105211 A1 | * | 6/2004 | Chung ........................ | 361/220 |

\* cited by examiner

Primary Examiner—Anthony Dinkins
Assistant Examiner—Adolfo Nino
(74) Attorney, Agent, or Firm—Mark M. Friedman

(57) ABSTRACT

Disclosed is a bipolar multi electrostatic inducing discharge-dissipation lightning air terminal, in which different charges are applied to upper and lower sections thereof by an isolation polymer insulator in such a manner that an earth-charge is preliminarily discharged as a thundercloud approaches, so that a thunderbolt is prevented from falling onto a building, thereby preventing a loss of lives and protecting electronic products installed in a building from being damaged. The bipolar multi electrostatic inducing discharge-dissipation lightning air terminal has a fixing bar vertically installed at an upper surface of the fixing member, an electrostatic induction member, which is provided at an upper portion of the fixing bar and upper and lower sections of which are charged with different charges based on an electric double layer theory and an electric dipolar action caused by an electrostatic induction in order to dissipate and discharge an earth-charge into an atmospheric space as a thundercloud approaches, and including an isolation polymer insulator provided at the upper portion of the fixing bar for increasing an insulation distance, an auxiliary discharging member, which has at least one thin plate to be stacked and through a center of which a lower end part of the isolation polymer insulator passes, a preliminarily discharging cap member made of conductive material and positioned at a lower surface of the auxiliary discharging member, and a preliminarily discharging member fixed to the fixing bar in such that the preliminarily discharging member maintains a non-contact state with respect to a lower surface of the auxiliary discharging member, and a cap member detachably coupled to a free end of the fixing bar for pressing an upper portion of the electrostatic induction member and for discharging the earth-charge as the thundercloud approaches.

8 Claims, 7 Drawing Sheets

BIPOLAR MULTI ELECTROSTATIC INDUCING DISCHARGE-DISSIPATION LIGHTNING AIR TERMINALS

BACKGROUND OF THE INVENTION

1. Field of the Invention

The present invention relates to bipolar multi electrostatic inducing discharge-dissipation lightning air terminals, and more particularly to bipolar multi electrostatic inducing discharge-dissipation lightning air terminals, which gradually dissipate and discharge an earth-charge into an atmospheric space as a thundercloud approaches.

2. Description of the Related Art

Generally, the falling of a thunderbolt does not occur when a middle-scaled air layer, such as a typhoon, or a large-scaled stable air layer rises. A thundercloud causing the falling of the thunderbolt is created when turbulent air having low air density is presented or air adjacent to a ground is locally heated so that air rapidly rises in a summer day having sufficient solar energy.

A quantity of electricity, which is generated upon the falling of the thunderbolt, is approximately one billion volts (V) of voltage and tens of thousand amperes (A) of current. In order to prevent a loss of lives and reduce direct/indirect damages applied to constructions or facilities, a lightning air-terminal has been mounted on a top of a building to be protected to safely induce impulse current generated due to the falling of the thunderbolt to the earth.

Such lightning air-terminal includes a supporting rod fixed to a fixed member having a grounded lightning conductor, a projected spine section fixedly connected to the supporting rod, and an earth electrode buried under piped water sectors in the ground for safely inducing (discharging) the thunderbolt absorbed via the projected spine section to the ground along the lightning conductor. Besides the above-mentioned lightning air terminal, various types of lightning air terminals including a lightning air terminal disclosed in U.S. Pat. No. 5,638,248 have been developed. According to the conventional lightning air terminals, when the thundercloud approaches, the projected spine is filled up with an earth-charge to induce the thunderbolt to the ground by absorbing the thunderbolt.

However, the conventional lightning air terminals have a problem that, because impulse current due to the falling of the thunderbolt is very great as described above, electronics products, such as telecommunication equipment, computers, and light electrical appliances installed in buildings, may be subject to an inductive disturbance caused by the falling of the thunderbolt, so that the electronic products may be malfunctioned or broken.

SUMMARY OF THE INVENTION

The present invention has been made to solve the above problems of the prior arts, therefore, it is an object of the present invention to provide a bipolar multi electrostatic inducing discharge-dissipation lightning air terminal, in which different charges are applied to upper and lower sections thereof by means of an isolation polymer insulator in such a manner that an earth-charge is preliminarily discharged as a thundercloud approaches, so that a thunderbolt is prevented from falling onto a building, thereby preventing a loss of lives and protecting electronic products installed in a building from being damaged.

To achieve the object of the present invention, there is provided a bipolar multi electrostatic inducing discharge-dissipation lightning air terminal for preventing a thunderbolt from falling onto an upper portion of a fixing member fixedly installed on a construction to be protected and having a lightning conductor connected to an earth electrode grounded to an earth; the bipolar multi electrostatic inducing discharge-dissipation lightning air terminal comprising: a fixing bar vertically installed at an upper surface of the fixing member; an electrostatic induction member, which is provided at an upper portion of the fixing bar and upper and lower sections of which are charged with different charges based on an electric double layer theory and an electric dipolar action caused by an electrostatic induction in order to dissipate and discharge an earth-charge into an atmospheric space as a thundercloud approaches, the electrostatic induction member including an isolation polymer insulator provided at the upper portion of the fixing bar for increasing an insulation distance, an auxiliary discharging member, which has at least one thin plate to be stacked and through a center of which a lower end part of the isolation polymer insulator passes, a preliminarily discharging cap member made of conductive material and positioned at a lower surface of the auxiliary discharging member, and a preliminarily discharging member fixed to the fixing bar in such a manner that the preliminarily discharging member maintains a non-contact state with respect to a lower surface of the auxiliary discharging member; and a cap member detachably coupled to a free end of the fixing bar for pressing an upper portion of the electrostatic induction member and for discharging the earth-charge as the thundercloud approaches.

According to the preferred embodiment of the present invention, a plurality of electrostatic induction members are stacked at the upper portion of the fixing bar.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENTS

Hereinafter, preferred embodiments of the present invention will be described in detail with reference to accompanying drawings. The preferred embodiments described below will not limit the scope of the present invention, but show examples of the present invention.

Before describing the preferred embodiments of the present invention, it is noted that fundamental notions of the present invention are to dissipate and discharge an earth-charge into an atmospheric space as a thundercloud approaches a bipolar multi electrostatic inducing discharge-dissipation lightning air terminal, thereby preventing the falling of a thunderbolt.

Now, a bipolar multi electrostatic inducing discharge-dissipation lightning air terminal of the present invention having the above-mentioned fundamental notions will be described with reference to accompanying drawings.

Figure 1:
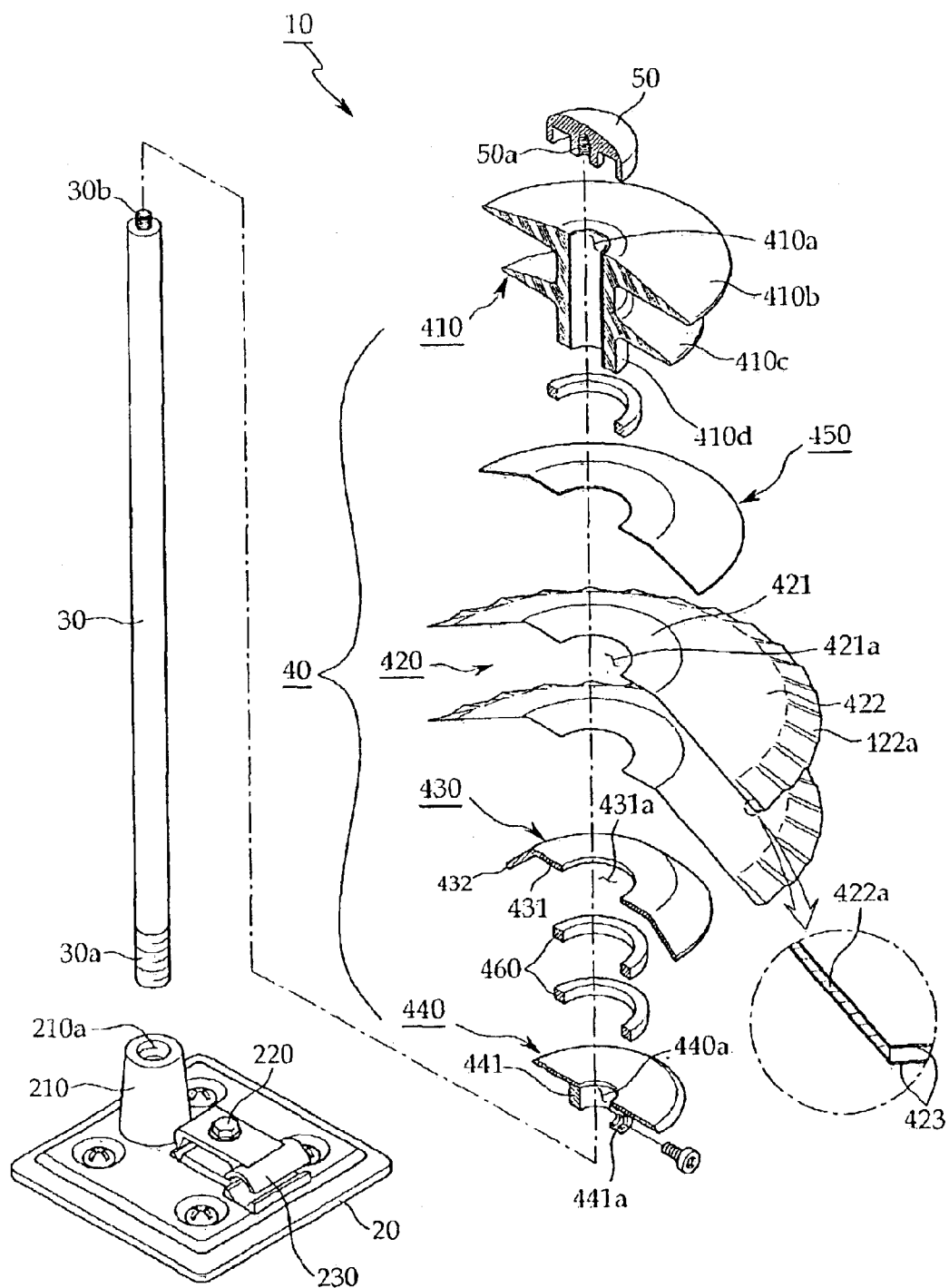
FIG. 1 is a half-sectional view showing a bipolar multi electrostatic inducing discharge-dissipation lightning air terminal according to a first embodiment of the present invention.
Figure 2:
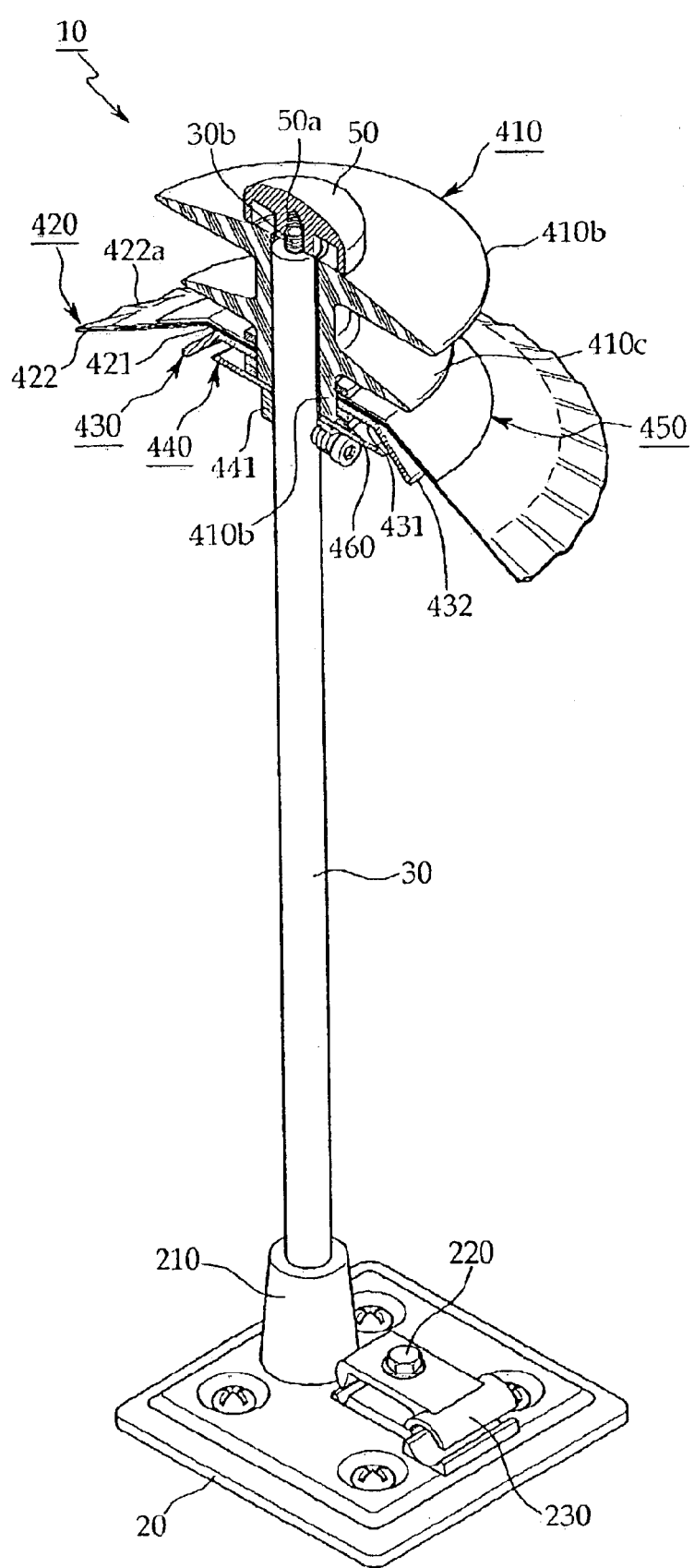
FIG. 2 is a half-sectional perspective view of a bipolar multi electrostatic inducing discharge-dissipation lightning air terminal shown in FIG. 1.

FIG. 1 is a half-sectional view showing a bipolar multi electrostatic inducing discharge-dissipation lightning air terminal 10 according to a first embodiment of the present invention, and FIG. 2 is a half-sectional perspective view of the bipolar multi electrostatic inducing discharge-dissipation lightning air terminal 10 shown in FIG. 1.

As shown in FIGS. 1 and 2, the bipolar multi electrostatic inducing discharge-dissipation lightning air terminal 10 includes a fixing bar 30 vertically installed on an upper surface of a fixing member 20, which has a lightning conductor connected to an earth electrode grounded to the earth and is fixed to a building to be protected by means of a fixing bolt, so as to prevent a thunderbolt from falling onto an upper portion the fixing member 20 as a thundercloud approaches, an electrostatic induction member 40, which is provided at an upper portion of the fixing bar 30 and upper and lower sections of which are charged with different charges based on an electric double layer theory and an electric dipolar action caused by an electrostatic induction in order to dissipate and discharge the earth-charge into an atmospheric space as the thundercloud approaches, and a cap member 50 formed at a lower center portion thereof with a screw hole 50a so as to be detachably coupled to a free end of the fixing bar 30, pressing an upper portion of the electrostatic induction member 40 when it is coupled to the free end of the fixing bar 30, and discharging the earth-charge as the thundercloud approaches.

The fixing member 20 is provided at the upper surface thereof with a coupling protrusion 210 having a screw hole 210a therein. A grounding piece 230 is provided beside the coupling protrusion 210. The grounding piece 230 is fastened or released by means of a fastening screw 220 in order to ground the lightning conductor to the earth.

The fixing bar 30 is formed at one end thereof with a screw part 30a so as to be screw-coupled into the screw hole 210a and is formed at the other end thereof with a fixing screw part 30b, which is screw-coupled into the cap member 50.

The electrostatic induction member 40 includes an isolation polymer insulator 410 provided at an upper portion of the fixing bar 30 for increasing an insulation distance between the cap member 50 and an auxiliary discharging member 420, which includes at least one thin plate and into which a lower end of the isolation polymer insulator 410 is inserted, a preliminarily discharging cap member 430 made of conductive material and formed at a center thereof with a hole for receiving the lower end of the isolation polymer insulator 410 in such a manner that an upper surface of the preliminarily discharging cap member 430 makes contact with a lower surface of the auxiliary discharging member 420, and a preliminarily discharging member 440 fixed to the fixing bar 30 by interposing a plurality of ring members 460 between the preliminarily discharging cap member 430 and the preliminarily discharging member 440 such that the preliminarily discharging member 440 does not make contact with the preliminarily discharging cap member 430. The preliminarily discharging member 440 has a disc shape and is formed at a lower surface thereof with a protrusion 441. The preliminarily discharging member 440 has a perforation hole 440a at a center thereof for receiving the fixing bar 30 and a fixing screw hole 441a formed at a sidewall of the protrusion 441a in communication with the perforation hole 440a in order to fixedly press an outer peripheral portion of the fixing bar 30 by using a screw member screw-coupled into the fixing screw hole 441a.

A protective member 450 is rested on an upper surface of the auxiliary discharging member 420 so as to prevent the auxiliary discharging member 420 from being damaged by external impact.

The isolation polymer insulator 410 has a cylindrical shape and is formed at a center thereof with a perforation hole 410a for receiving the fixing bar 30. Upper and lower extension pieces 410b and 41° C., which are spaced from each other by a predetermined distance, are formed at an outer peripheral portion of the isolation polymer insulator 410 in such a manner that the insulation distance between the cap member 50 and the auxiliary discharging member 420 is enlarged. The lower extension piece 410c is positioned at an approximately middle portion of the isolation polymer insulator 410 such that an insertion part 410d for sequentially receiving the protective member 450, the auxiliary discharging member 420, and the preliminarily discharging cap member 430 is formed at an end of the isolation polymer insulator 410.

The auxiliary discharging member 420 has a circular plate shape and is formed at a center thereof with a horizontal surface 421a having an insertion hole 421a for receiving the insertion part 410d of the isolation polymer insulator 410, and formed at a peripheral portion thereof with an inclined surface 422, which is inclined downwardly outward from the horizontal surface 421 and formed at an outer circumferential portion thereof with a corrugated section 422a for preventing stacked auxiliary discharging members 420 from being rotated.

In addition, an insulation material layer 423 including epoxy resin is coated on both surfaces of the auxiliary discharging member 420 so as to increase capacitance.

The insulation material layer 423 can be selectively coated only on an upper surface or a lower surface of the auxiliary discharging member 420.

In addition, the protective member 450 has a sectional area corresponding to a sectional area of the auxiliary discharging member 420. The preliminarily discharging cap member 430 is formed at a center thereof with a planar surface 431 having a hole 431a for receiving the insertion part 410d of the isolation polymer insulator 410 in such a manner that a front end of the insertion part 410d of the isolation polymer insulator 410 is adjacent to a front end of the preliminarily discharging member 440. A preliminarily discharging surface 432 is inclined downwardly outward from the planar surface 431.

Although the bipolar multi electrostatic inducing discharge-dissipation lightning air terminal 10 according to present invention includes the electrostatic induction member 40 having the isolation polymer insulator 410 formed on the upper portion of the fixing bar 30, the auxiliary discharging member 420, preliminarily discharging cap member 430, and the preliminarily discharging member 440 as shown in FIGS. 1 and 2, it is also possible to provide a preliminarily discharging brush member 6Q, which is positioned between a preliminarily discharging cap member 430' and a preliminarily discharging member 446' so as to facilitate a preliminary discharge as the thundercloud approaches. The preliminarily discharging brush member 60 is formed at a circumferential portion thereof with a plurality of fins 610 and formed at a center thereof with a disc-type fixing plate 620 having a perforation hole 620*a* for receiving the fixing bar 301 as shown in FIG. 3.

Figure 3:
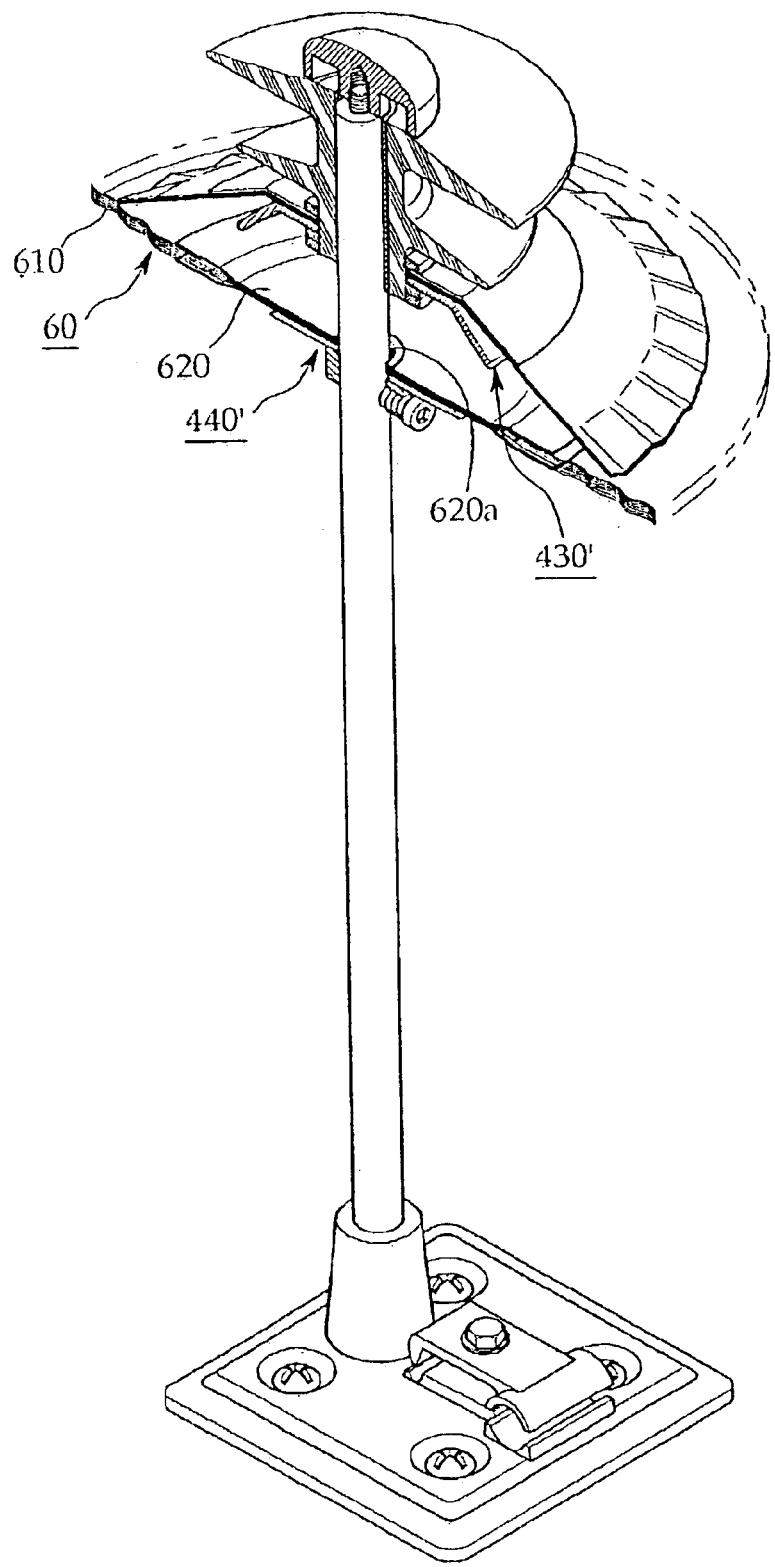
FIG. 3 is a half-sectional perspective view of a bipolar multi electrostatic inducing discharge-dissipation lightning air terminal according to a second embodiment of the present invention.
Figure 4:
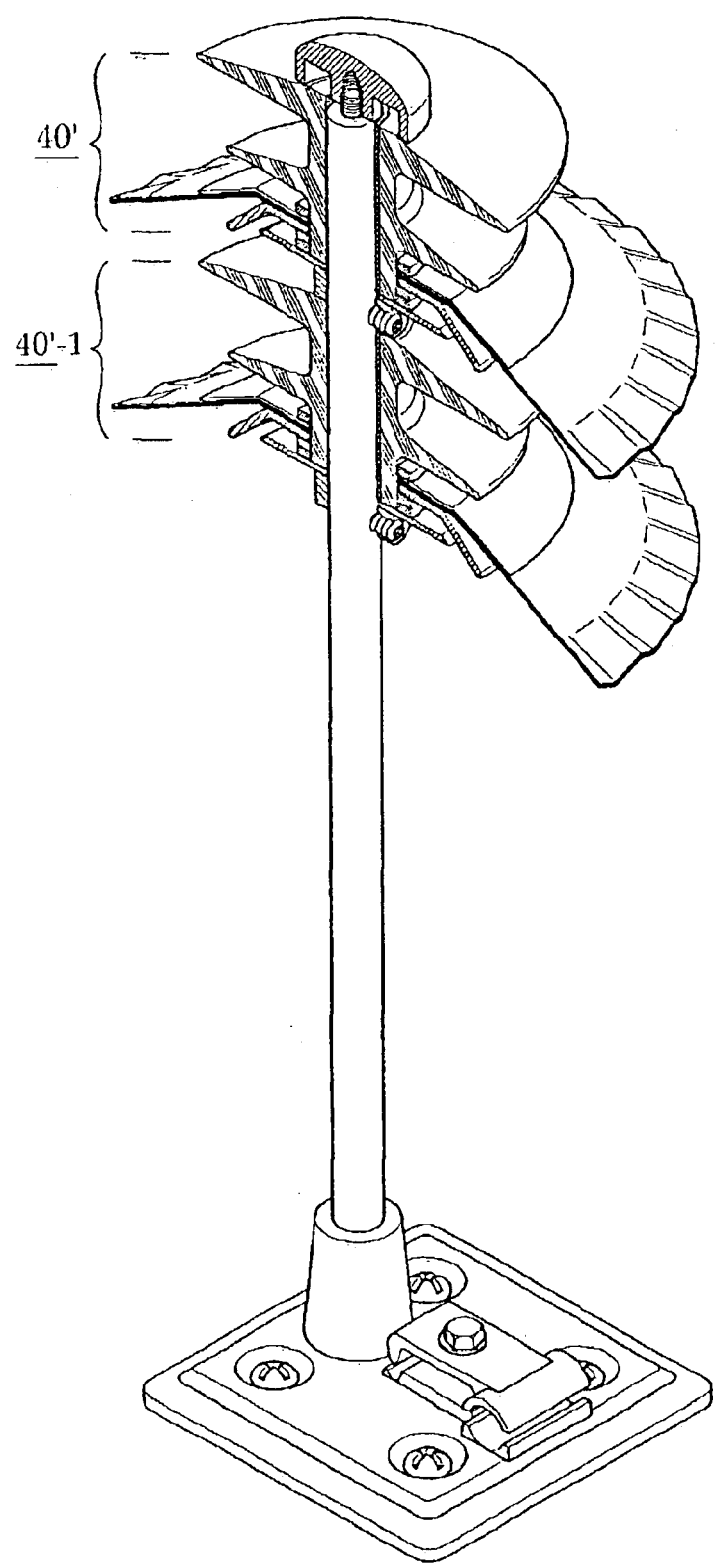
FIG. 4 is a half-sectional perspective view of a bipolar multi electrostatic inducing discharge-dissipation lightning air terminal according to a third embodiment of the present invention.
Figure 5:
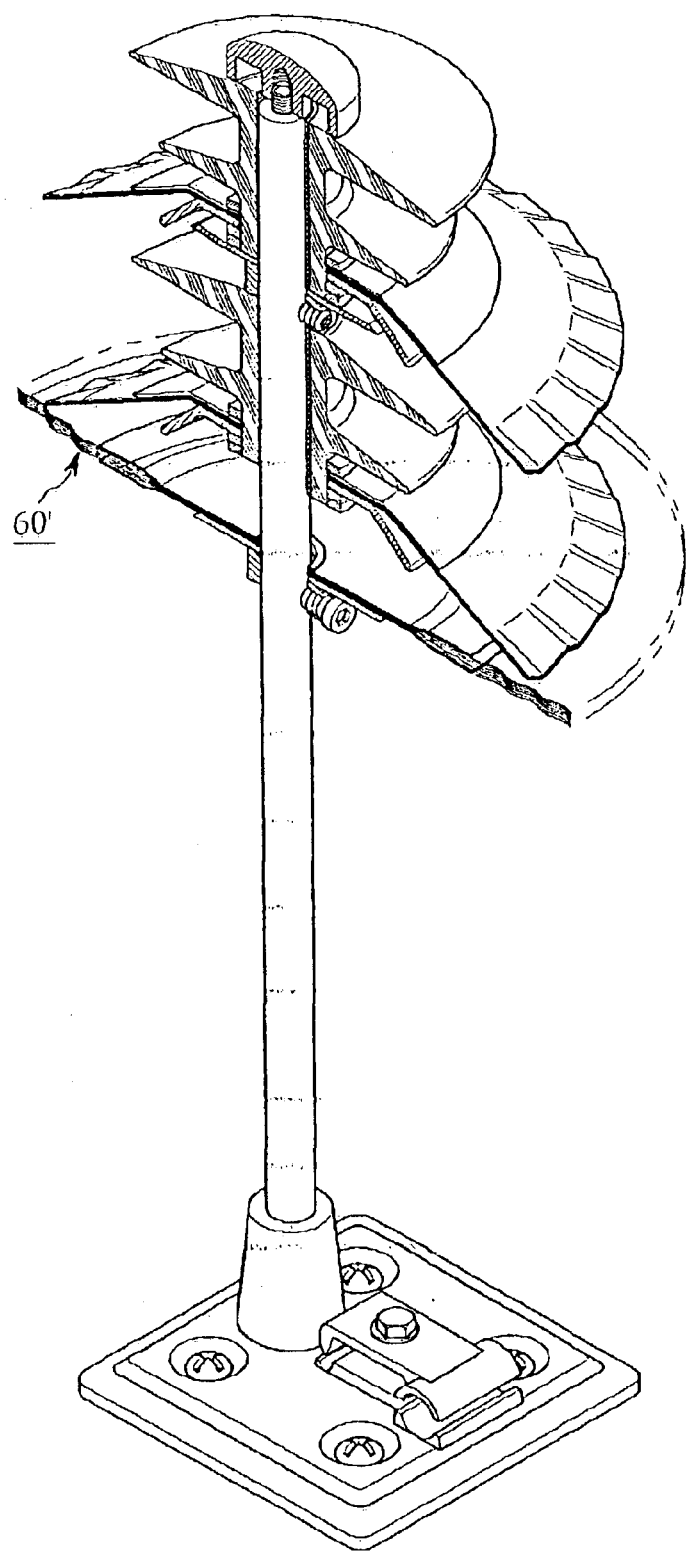
FIG. 5 is a half-sectional perspective view of a bipolar multi electrostatic inducing discharge-dissipation lightning air terminal according to a fourth embodiment of the present invention.
Figure 6:
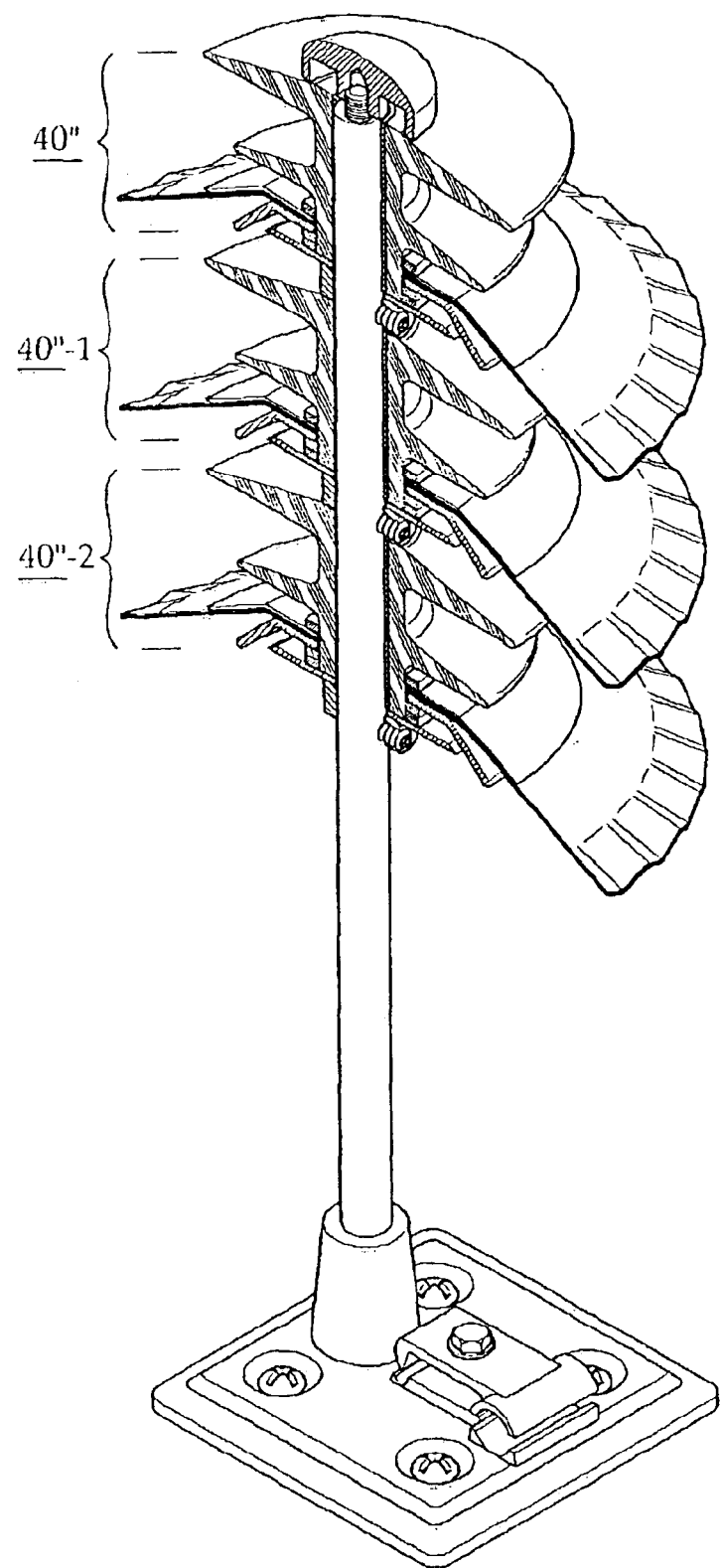
FIG. 6 is a half-sectional perspective view of a bipolar multi electrostatic inducing discharge-dissipation lightning air terminal according to a fifth embodiment of the present invention.
Figure 7:
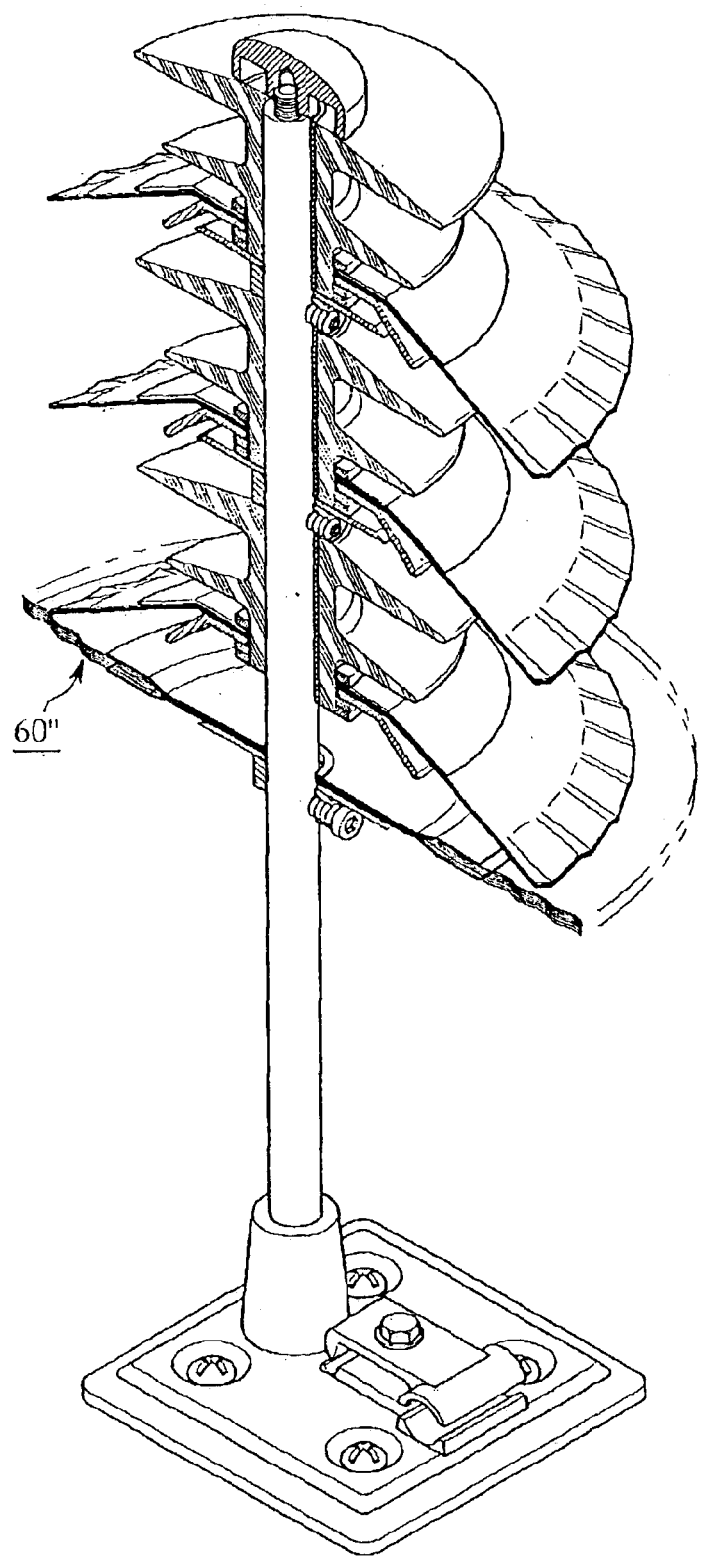
FIG. 7 is a half-sectional perspective view of a bipolar multi electrostatic inducing discharge-dissipation lightning air terminal according to a sixth embodiment of the present invention.

In addition, although a single electrostatic induction member is illustrated in FIGS. 1 to 3, it is also possible to provide two electrostatic induction members 40' and 40'-1 in a double layer structure as shown in FIG. 4, and to provide three electrostatic induction members 40", 40"-1 and 40"-2 in a triple layer structure as shown in FIG. 6. In addition, as shown in FIGS. 5 and 7, it is possible to add preliminarily discharging brush members 60' and 60" to the double layered or triple layered electrostatic induction member 40'-1 or 40"-2 to facilitate preliminary discharge as the thundercloud approaches.

When the bipolar multi electrostatic inducing discharge-dissipation lightning air terminal 10 of the present invention is installed on buildings or facilities to be protected, as shown in FIGS. 1 and 2, the screw part 30*a* formed at one end of the fixing bar 30 is screw-coupled into the coupling screw hole 210*a* formed in the coupling protrusion 210 of the fixing member 220, which is fixed to an upper portion of the buildings or facilities to be protected by fixing the lightning conductor connected to the earth electrode to the grounding piece 230 of the fixing member 220.

Then, after fixing the electrostatic induction member 40 to the upper portion of the fixing bar 30, the cap member 50 is screw-coupled to the fixing bar 30 in such a manner that the electrostatic induction member 40 is prevented from being separated from the fixing bar 30.

That is, the fixing bar 30 is firstly inserted into the perforation hole 440*a* of the preliminarily discharging member 440 and the screw member is screw-coupled into the fixing screw hole 441*a* formed at the sidewall of the protrusion 441 so as to fix the fixing bar 30.

Then, after sequentially stacking the protective member 450, the auxiliary discharging member 420 and the preliminarily discharging cap member 430 around the insertion part 410*d* of the isolation polymer insulator 410, the isolation polymer insulator 410 is rested on the upper surface of the preliminarily discharging member 440 by interposing ring members 460 therebetween.

When the isolation polymer insulator 410 is rested on the upper surface of the preliminarily discharging member 440, the cap member 50 is screw-coupled with the fixing screw part 30*b* through the screw hole 50*a* formed at the lower surface thereof such that the isolation polymer insulator 410 is securely fixed, thereby completing the installation of the bipolar multi electrostatic inducing discharge-dissipation lightning air terminal 10.

If the thundercloud approaches the bipolar multi electrostatic inducing discharge-dissipation lightning air terminal 10 installed as mentioned above, a plus earth-charge is applied to the cap member 50, which is screw-coupled to the upper portion of the fixing bar 30, and the preliminarily discharging member 440 of the electrostatic induction member 40 and a minus charge inverse to the earth-charge is applied to the protective member 450, the auxiliary discharging member 420 and the preliminarily discharging cap member 430, which are sequentially stacked around the insertion part 410*d* of the isolation polymer insulator 410, so that a discharge of the earth-charge is generated in a space formed between the preliminarily discharging member 440 and the preliminarily discharging cap member 430, thereby preventing the thunderbolt from falling onto the bipolar multi electrostatic inducing discharge-dissipation lightning air terminal 10.

In addition, if the thundercloud approaches the bipolar multi electrostatic inducing discharge-dissipation lightning air terminal 10 including electrostatic induction members 40' and 40'-1 stacked in a double layer structure, the discharge of the earth-charge is firstly generated from the electrostatic induction members 40'-1 positioned at a lower part of the double layer structure corresponding to a distance with respect to the thunderbolt. Then, as the thundercloud more approaches the bipolar multi electrostatic inducing discharge-dissipation lightning air terminal 10, the discharge of the earth-charge is generated from the electrostatic induction members 40' positioned at an upper part of the double layer structure, thereby preventing the thunderbolt from falling onto the bipolar multi electrostatic inducing discharge-dissipation lightning airterminal 10.

In addition, as shown in FIG. 6, it the thundercloud approaches the bipolar multi electrostatic inducing discharge-dissipation lightning air terminal 10 including electrostatic induction members 40', 40"-1 and 40"-2 stacked in a triple layer structure, the discharge of the earth-charge is sequentially generated from the lowest electrostatic induction members 40"-2 corresponding to the distance with respect to the thundercloud, thereby preventing the thunderbolt from falling onto the bipolar multi electrostatic inducing discharge-dissipation lightning air terminal 10.

Therefore, the bipolar multi electrostatic inducing discharge-dissipation lightning air terminal 10 according to the present invention can prevent the thunderbolt from falling on the buildings and facilities, thereby preventing a loss of lives and protecting electronic products installed in the buildings or facilities from being damaged.

As mentioned above, according to the bipolar multi electrostatic inducing discharge-dissipation lightning air terminal of the present invention, a minus charge inverse to the earth-charge is applied to the protective member, the auxiliary discharging member and the preliminarily discharging cap member, which are sequentially stacked around the insertion part of the isolation polymer insulator, and a plus earth-charge is applied to the cap member, which is screw-coupled to the upper portion of the fixing bar, and the preliminarily discharging member of the electrostatic induction member, so that the earth-charge is preliminarily discharged, thereby preventing the thunderbolt from falling onto buildings or facilities, thereby preventing a loss of lives and protecting electronic products installed in the buildings or facilities from being damaged.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A bipolar multi electrostatic inducing discharge-dissipation lightning air terminal for preventing a thunderbolt from falling onto an upper portion of a fixing member fixedly installed on a construction to be protected and having a lightning conductor connected to an earth electrode grounded to an earth, the bipolar multi electrostatic inducing discharge-dissipation lightning air terminal comprising:

a fixing bar vertically installed at an upper surface of the fixing member;

an electrostatic induction member, which is provided at an upper portion of the fixing bar and upper and lower sections of which are charged with different charges based on an electric double layer theory and an electric dipolar action caused by an electrostatic induction in order to dissipate and discharge an earth-charge into an atmospheric space as a thundercloud approaches, the electrostatic induction member including an isolation polymer insulator provided at the upper portion of the fixing bar for increasing an insulation distance, an auxiliary discharging member, which has at least one thin plate to be stacked through a center of which a lower end part of the isolation polymer insulator passes, a preliminarily discharging cap member made of conductive material and positioned at a lower surface of the auxiliary discharging member, and a preliminarily discharging member fixed to the fixing bar in such a manner that the preliminarily discharging member maintains a non-contact state with respect to a lower surface of the auxiliary discharging member; and a cap member detachably coupled to a free end of the fixing bar for pressing an upper portion of the electrostatic induction member and for discharging the earth-charge as the thundercloud approaches.

2. The bipolar multi electrostatic inducing discharge-dissipation lightning air terminal as claimed in claim 1, wherein a plurality of electrostatic induction members are stacked at the upper portion of the fixing bar.

3. The bipolar multi electrostatic inducing discharge-dissipation lightning air terminal as claimed in claim 2, wherein a preliminarily discharging brush member is positioned between the preliminarily discharging cap member and the preliminarily discharging member so as to facilitate a preliminary discharge as the thundercloud approaches, the preliminarily discharging brush member having a plurality of fins at a circumferential portion thereof and being formed at a center thereof with a disc-type fixing plate having a perforation hole for receiving the fixing bar.

4. The bipolar multi electrostatic inducing discharge-dissipation lightning air terminal as claimed in claim 1, wherein a protective member is rested on an upper surface of the auxiliary discharging member so as to prevent the auxiliary discharging member from being damaged by external impact.

5. The bipolar multi electrostatic inducing discharge-dissipation lightning air terminal as claimed in claim 1, wherein the isolation polymer insulator has a cylindrical shape and is formed at a center thereof with a perforation hole for receiving the fixing bar, upper and lower extension pieces, which are spaced from each other by a predetermined distance, are formed at an outer peripheral portion of the isolation polymer insulator, and the lower extension piece is positioned at an approximately middle portion of the isolation polymer insulator such that an insertion part for sequentially receiving a protective member, the auxiliary discharging member, and the preliminarily discharging cap member is formed at an end of the isolation polymer insulator.

6. The bipolar multi electrostatic inducing discharge-dissipation lightning air terminal as claimed in claim 5, wherein the auxiliary discharging member has a circular plate shape and is formed at a center thereof with a horizontal surface having an insertion hole for receiving the insertion part of the isolation polymer insulator and formed at a peripheral portion thereof with an inclined surface, which is inclined downwardly outward from the horizontal surface and formed at an outer circumferential portion thereof with a corrugated section for preventing stacked auxiliary discharging members from being rotated.

7. The bipolar multi electrostatic inducing discharge-dissipation lightning air terminal as claimed in claim 1, wherein the preliminarily discharging member has a disc shape and is formed at a lower surface thereof with a protrusion, the preliminarily discharging member has a perforation hole at a center thereof for receiving the fixing bar and a fixing screw hole formed at a sidewall of the protrusion in communication with the perforation hole in order to fixedly press an outer peripheral portion of the fixing bar by using a screw member screw-coupled into the fixing screw hole.

8. The bipolar multi electrostatic inducing discharge-dissipation lightning air terminal as claimed in claim 1, wherein an insulation material layer including epoxy resin is coated on one surface or both surfaces of the auxiliary discharging member to increase capacitance.

* * * * *